US010692111B1

(12) United States Patent
Chik (10) Patent No.: US 10,692,111 B1
(45) Date of Patent: Jun. 23, 2020

(54) SYSTEMS AND METHODS FOR REDUCING ONLINE CONTENT DELIVERY LATENCY

(71) Applicant: Google Inc., Mountain View, CA (US)

(72) Inventor: Alex Kwan Yeung Chik, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 1680 days.

(21) Appl. No.: 14/261,920

(22) Filed: Apr. 25, 2014

(51) Int. Cl.
*G06F 3/0484* (2013.01)
*G06Q 30/02* (2012.01)

(52) U.S. Cl.
CPC .................. *G06Q 30/0269* (2013.01)

(58) Field of Classification Search
CPC ...................... G06Q 30/00–30/0284
USPC .......................................... 714/762
See application file for complete search history.

(56) References Cited

U.S. PATENT DOCUMENTS

| 6,449,657 | B2 | 9/2002 | Stanbach, Jr. et al. | |
|---|---|---|---|---|
| 7,668,740 | B1* | 2/2010 | Baggett | G06F 17/30457 345/557 |
| 8,577,724 | B1* | 11/2013 | Gandhi | G06Q 30/0241 705/14.49 |
| 9,514,467 | B2* | 12/2016 | De | G06Q 30/02 |
| 2003/0097405 | A1* | 5/2003 | Laux | H04L 29/06 709/203 |
| 2007/0088801 | A1* | 4/2007 | Levkovitz | H04L 67/04 709/217 |
| 2007/0239819 | A1 | 10/2007 | Woods et al. | |
| 2008/0256418 | A1* | 10/2008 | Luby | H03M 13/27 714/762 |
| 2012/0023504 | A1* | 1/2012 | Noam | H04L 65/00 718/105 |
| 2012/0278432 | A1 | 11/2012 | Luna | |
| 2014/0045461 | A1* | 2/2014 | Khoury | G06Q 10/107 455/411 |

(Continued)

FOREIGN PATENT DOCUMENTS

WO        2013192127 A1    12/2013

OTHER PUBLICATIONS

Han HuToward Rendering Latency Reduction for Composable Web Services via Priority Based Object Caching, IEEE, Jul. 2018, Section I and II (Year: 2017).*

*Primary Examiner* — Anita Coupe
*Assistant Examiner* — Darnell A Pouncil
(74) *Attorney, Agent, or Firm* — Foley & Lardner LLP (57) ABSTRACT

A computer-based method for asynchronously requesting content items to a user computing device is described. The method is implemented using a user computing device in communication with a memory. The method includes receiving a content management response, generating a plurality of content request messages for requesting at least one content item from a plurality of content providers based on the plurality of links, asynchronously transmitting a first content request message to a first content provider and a second content request message to a second content provider where the first and second content request messages are transmitted based on the at least one transmission rule, receiving a content response message including a content item from at least one of the first and the second content provider, determining the content item to display on the user computing device, and displaying the determined online content item on the user computing device.

21 Claims, 6 Drawing Sheets

(56) References Cited

U.S. PATENT DOCUMENTS

2014/0237085 A1* 8/2014 Park .................. G06Q 50/10
709/219

* cited by examiner

SYSTEMS AND METHODS FOR REDUCING ONLINE CONTENT DELIVERY LATENCY

BACKGROUND

This description relates to presenting online content items in combination with online publications, and more particularly to a network-based system and method for asynchronously retrieving and serving online content such as video content along with other online publications.

Internet users are able to view online publications (e.g., video publications) on user devices. At least some of these online publications include movies, television programs, and other videos. These online publications are displayed along with online content items (e.g., video advertisements) where the online content item is displayed at a predetermined time during the display of the online publication (e.g., before, during, or after). In the case where an online video publication is being displayed on a user device and the video publication reaches a point where an online content item (e.g., video ad) is to be displayed to the user, the user device will transmit a call to an online content provider. The online content provider serves an appropriate online content item to the user device for displaying. However, in some cases, the online content provider may not have an appropriate online content item to provide to the user and instead may have to instruct the user device to request online content items from one or more content providers. Each time a call is made by the user device or by the online content provider causes further delay in serving and displaying the online content item to the user. These delays can frustrate the user.

BRIEF DESCRIPTION OF THE DISCLOSURE

In one aspect, a computer-based method for asynchronously requesting content items to a user computing device is provided. The method is implemented using a user computing device in communication with a memory. The method includes receiving by the user computing device a content management response including a plurality of links to content providers. The method also includes generating by the user computing device a plurality of content request messages for requesting at least one content item from a plurality of content providers based on the plurality of links included within the content management response and at least one transmission rule, and asynchronously transmitting by the user computing device a first content request message to a first content provider of the plurality of content providers and a second content request message to a second content provider of the plurality of content providers. Each content request message is configured to request at least one content item and the first and second content request messages are transmitted based on the at least one transmission rule. The method further includes receiving by the user computing device a content response message including a content item from at least one of the first and second content provider, determining by the user computing device the content item to display on the user computing device, and displaying the determined content item on the user computing device.

In another aspect, a computing device for asynchronously requesting content items to a user device is provided. The computing device includes at least one processor communicatively coupled to at least one memory device. The computing device configured to receive a content management response including a plurality of links to content providers, generate a plurality of content request messages for requesting at least one content item from a plurality of content providers based on the plurality of links included within the content management response and at least one transmission rule, and asynchronously transmit a first content request message to a first content provider of the plurality of content providers and a second content request message to a second content provider of the plurality of content providers. Each content request message is configured to request at least one content item and the first and second content request messages are transmitted based on the at least one transmission rule. The computing device is also configured to receive a content response message including a content item from at least one of the first and second content provider, determine the content item to display on the computing device, and display the determined content item on the computing device.

In another aspect, a computer-readable storage device having processor-executable instructions embodied thereon is provided. The processor-executable instructions are for asynchronously requesting content items by a user computing device, wherein when executed by the user computing device communicatively coupled to a memory, the processor-executable instructions cause the user computing device to receive a content management response including a plurality of links to content providers, generate a plurality of content request messages for requesting at least one content item from a plurality of content providers based on the plurality of links included within the content management response and at least one transmission rule, and asynchronously transmit a first content request message to a first content provider of the plurality of content providers and a second content request message to a second content provider of the plurality of content providers. Each content request message is configured to request at least one content item and the first and second content request messages are transmitted based on the at least one transmission rule. The processor-executable instructions also cause the user computing device to receive a content response message including a content item from at least one of the first and second content provider, determine the content item to display on the user computing device, and display the determined content item on the user computing device.

In another aspect, a content management server is provided. The content management server is configured to receive a content management request from a client device requesting at least one content item, process the content management request, generate a content management response including a plurality of links to a plurality of content providers, and transmit the content management response to the client device. The client device is configured to generate a plurality of content request messages for requesting at least one content item from a plurality of content providers based on the plurality of links included within the content management response and at least one transmission rule, and asynchronously transmit the plurality of content request messages to the plurality of content providers, where asynchronously includes at least one of simultaneously and effectively simultaneously.

In another aspect, a computing device for asynchronously requesting content items is provided. The computing device includes at least one processor communicatively coupled to at least one memory device. The computing device includes a means for receiving a content management response including a plurality of links to content providers. Additionally, the computing device includes a means for generating a plurality of content request messages for requesting at least one content item from a plurality of content providers based on the plurality of links included within the content management response and at least one transmission rule. Additionally, the computing device includes a means for asynchronously transmitting a first content request message to a first content provider of the plurality of content providers and a second content request message to a second content provider of the plurality of content provider. Each content request message is configured to request at least one content item and the first and second content request messages are transmitted based on the at least one transmission rule. Additionally, the computing device includes a means for receiving a content response message including a content item from at least one of the first and second content provider. Additionally, the computing device includes a means for determining the content item to display on the computing device. Additionally, the computing device includes a means for displaying the determined content item on the computing device.

In another aspect, a computing device as described above is provided, wherein the at least one transmission rule defines a period of time between transmitting each content request message to the content providers.

In another aspect, a computing device as described above is provided, wherein the period of time is between 0 seconds and a time-out period included within the content management message.

In another aspect, a computing device as described above is provided, wherein the at least one transmission rule defines a priority of the content providers, wherein a higher priority content provider receives a content request message before a lower priority content provider.

In another aspect, a computing device as described above is provided, wherein the first content request message and the second content request message are asynchronously transmitted to the first and second content providers, where asynchronously includes at least one of simultaneously or effectively simultaneously.

In another aspect, a computing device as described above is provided, wherein the means for determining the content item to display further includes a means for determining which content item received first by the computing device first from the first and second content providers and a means for displaying the first received content item on the computing device.

In another aspect, a computing device as described above is provided, wherein the means for determining which content item to display further includes a means for receiving a first price signal from the first content provider, a means for receiving a second price signal from the second content provider, a means for comparing the first price signal and the second price signal, and additionally a means for displaying the determined content item based on the received price signals.

In another aspect, a computing device as described above is provided, additionally including a means for transmitting a content management request to a server to request at least one content item, the content management request being transmitted before receiving the content management response.

In another aspect, a computing device as described above is provided, wherein the content items are video advertisements.

In another aspect, a computing device as described above is provided, wherein the content management response further includes a time-out period and the computing device also includes a means for simultaneously transmitting the plurality of content request messages to the plurality of content providers. The computing device further includes a means for starting a timer upon transmitting the plurality of content request messages. Additionally the computing device includes a means for playing an online content publication on the user device if no content response is received before the timer reaches the time-out period.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations refers to the accompanying drawings. The same reference numbers in different drawings may identify the same or similar elements. Also, the following detailed description does not limit the claims.

The subject matter described herein relates to presenting online content items in combination with online publications and, more specifically, improving response time for filling online content by requesting multiple online content items simultaneously or nearly simultaneously. Online content items are, for example, video advertisements associated with goods or services. Online publications are, for example, video publications that users may view over the Internet, such as movies, television programs, and other video items.

Embodiments of the described methods and systems determine how to asynchronously request online content items (e.g., video ads) from multiple online content networks (e.g. ad networks). In the example embodiment, a user access device includes a video player client for displaying online publications (e.g., video publications). The video player client includes an online content controller (OCC) such as an interactive media ads software development kit (also known as an IMA SDK). While displaying online publications from a website, the OCC is configured to determine that an online content item is to be displayed. The OCC transmits a management system (MS) content request to a content management system (CMS), which stores and provides online content items. In some cases, the CMS determines that there are currently no online content items available for serving to the OCC (or at least determines there are no appropriate online content items available) and sends a MS content response to the OCC. In the example embodiment, the MS content response contains links to multiple content providers that may be able to provide the video player client with online content. The MS content response also includes a time-out value (e.g., 4 seconds).

In the example embodiment, the OCC generates online content request messages to transmit to all of the content providers from the MS content response message. The OCC then transmits all of the generated online content request messages simultaneously or effectively simultaneously (collectively referred to herein as "asynchronously") to the multiple content providers. In the example embodiment, the term "asynchronously" means transmitting the online content request message simultaneously (i.e., at the same time) or effectively simultaneously (i.e., nearly at the same time). Transmitting the messages simultaneously means transmitting the messages at the same time and not waiting for the time-out period to expire before sending the next message. Transmitting the messages effectively simultaneously means transmitting the messages at nearly the same time such that all of the messages are sent to the content providers in less than the time-out period and, in most cases, well before the time-out period has expired. Each message is sent at the same time or as close to the same time as possible so as to be transmitted functionally simultaneously.

The asynchronous transmission is defined by one or more transmission rules. In some embodiments, the transmission rules define a delay between transmitting the online content request messages to be zero seconds. In other embodiments, the transmission rules may define the delay between transmitting messages to be greater than zero, but less than the time-out period. In some further embodiments, the transmission rules may order different online content request messages, so that certain requests are transmitted before others.

For example, the MS content response message may contain a list of 3 links to 3 different content providers and a time-out period of 4 seconds. In this example, the OCC generates 3 online content request messages, one for each link in the MS content response message. The OCC transmits one of the online content request messages and starts a timer. The OCC transmits another online content request message 0.1 seconds later. The OCC transmits the last online content request message 0.1 seconds after that. In this example, all three of the online content messages are transmitted within a period of 0.2 seconds, well before the timer reached the time-out period of 4 seconds.

In a further example, one of the 3 online content request messages has priority over the other two online content request messages. The OCC transmits the online content request message with priority first and starts the timer. The OCC delays 1 second before transmitting a different online content request message. Then, the OCC transmits the last online content request message 0.1 seconds later. All three messages are transmitted within a period of 1.1 seconds and well before the time-out period has expired.

After transmitting the online content messages, the OCC starts a timer and waits for an online content response message from the content providers. In the example embodiment, the OCC waits until it receives a first online content response message from one of the content providers, which includes a link to an online content item. The OCC passes the link for the online content item to the video player client, which retrieves the online content item and begins to play the online content item for a user.

If no online content response message is received from any of the content providers before the timer expires (e.g., 4 seconds after the first online content request message is transmitted), then the video player client begins to play an online publication instead. The online publication may be one that the video player client had paused to play the online content or the online publication may be one that the video player client had not started playing yet.

In some embodiments, there may be a short delay (less than the time-out period) between the transmission of the online content request messages. In these embodiments, one or more of the content providers may have priority over the other content providers. For example, a first content provider may have been given priority over two other content providers. After transmitting the online content request message for the first content provider there is a delay period (e.g., 1 second) before transmitting the online content request messages for the other two content providers. In these embodiments, the OCC still waits for the first online content response message from any of the content providers.

In additional embodiments, the OCC may receive pricing signals from the content providers in addition to the online content response messages. These pricing signals may be included in the online content response messages or may be provided separately. Instead of playing the online content item received in the first online content response message that the OCC received, the OCC may wait to receive multiple online content response messages. Then the OCC compares the pricing signals for the received online content response messages and determines which online content item for the video player client to display based on the received pricing signals.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) determining that new online content items are required; (b) transmitting a MS content request to a content management server; (c) receiving a MS content response from the content management server, wherein the MS content response includes a plurality of links to content providers; (d) generating a plurality of request messages for online content items for asynchronously transmitting to more than one content provider based on the plurality of links and one or more transmission rules, wherein the one or more transmission rules define a period of time between transmitting each request message, and wherein the period of time is between 0 seconds and a time-out period; (e) transmitting a first request message for an online content item to a first content provider; (f) transmitting a second request message for an online content item to a second content provider based on a transmission rule; (g) receiving an online content response from the first or the second content provider; (h) determining which online content item to display on the user device by determining which online content response arrived first; and (i) directing the user device to display the determined online content item.

Figure 1:
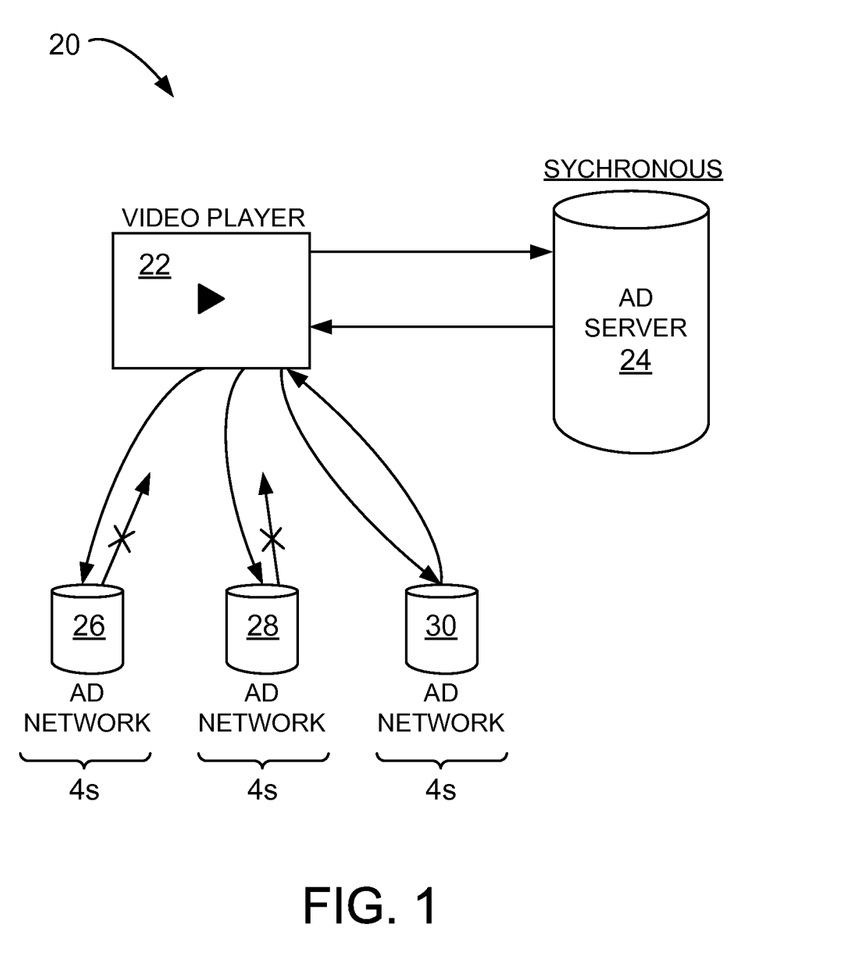
FIG. 1 is a dataflow diagram showing a known synchronous data flow between a video player operating on a user device (not shown), an ad server, and a plurality of ad networks.

FIG. 1 is a dataflow diagram showing a known synchronous data flow 20 between a video player 22 operating on a user device (not shown), an ad server 24, and a plurality of ad networks 26, 28, and 30. In known systems for synchronously serving video ads, video players 22 display video content such as movies, television programs and other videos, as well as video advertisements, to a user. When the video player 22 determines that a video advertisement is to be displayed, the video player 22 requests a video ad from the ad server 24. If the ad server 24 determines that it does not have any video ads available to display, the ad server 24 responds with contact information to multiple ad networks 26, 28, and 30 that may have video ads available. The video player 22 generates and transmits a video ad request to the first ad network 26. The video player 22 then starts a timer and waits for a response from the first ad network 26. If no response is received by the time the timer reaches the time-out value (e.g., four seconds later), the video player 22 generates and transmits a video ad request to the second ad network 28. The video player 22 then starts a timer and waits for a response from the second ad network 28. If no response is received by the time the timer reaches the time-out value (e.g., four seconds later), the video player 22 generates and transmits a video ad request to the third ad network 30. The video player 22 then starts a timer and waits for a response from the third ad network 30. In this case, the video player 22 receives a video advertisement from the third ad network 30. The video player 22 begins to play the video advertisement.

As seen in the known synchronous data flow 20, video advertisements do not always fill. In some situations, the video player 22 has to wait long periods of time before it can display a video advertisement. In these situations, users are likely to lose interest in the video advertisement and the video that they were originally watching. The asynchronous system described below addresses the latency problem of the synchronous system.

Figure 2:
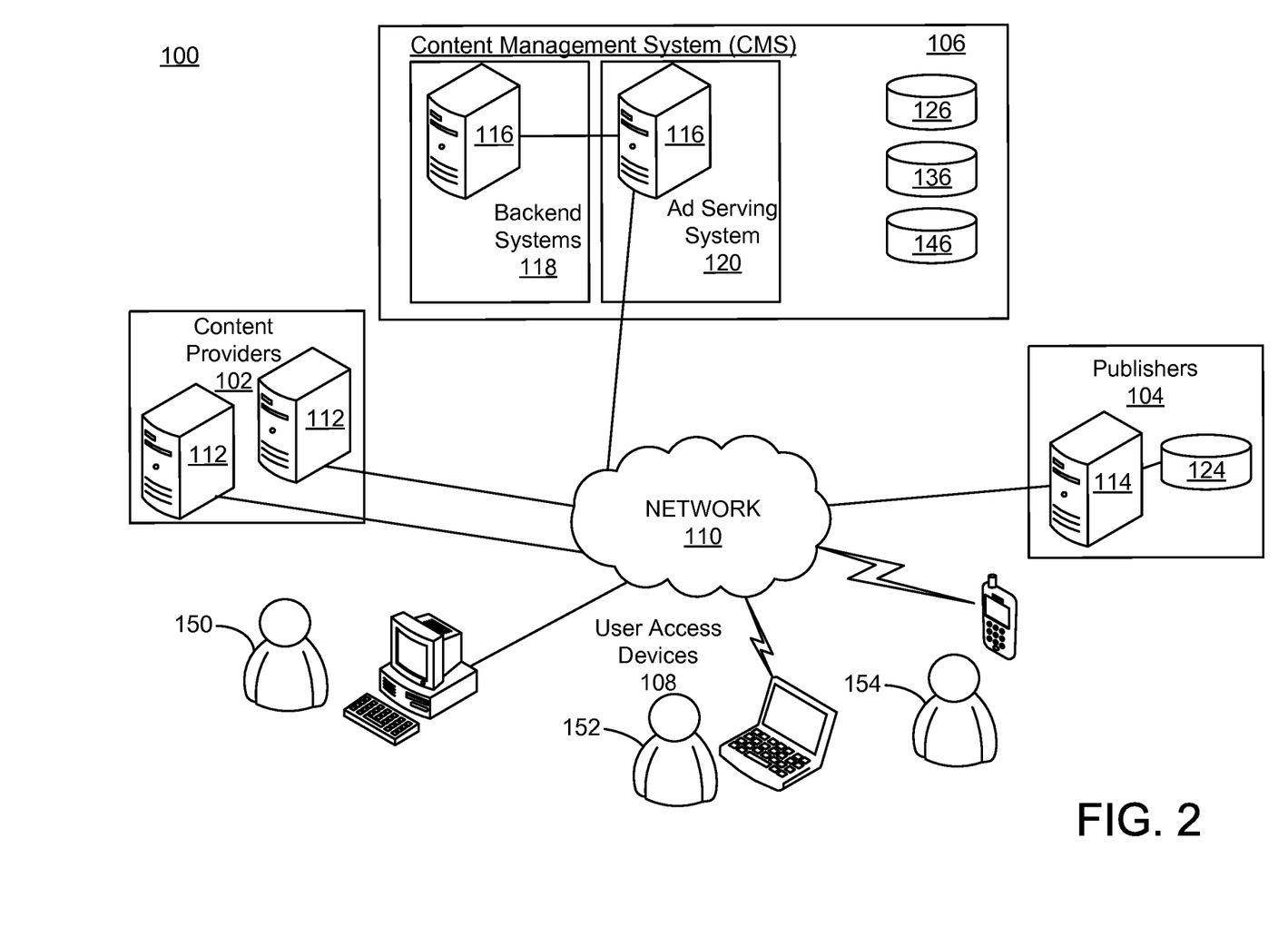
FIG. 2 is a diagram depicting an example networked environment for asynchronously serving online content items to a user device in combination with online publications.

FIG. 2 is a diagram depicting an example networked environment for asynchronously serving online content items to a user device in combination with online publications. With reference to FIG. 2, an example networked environment 100 may include one or more content providers 102, one or more publishers 104, a content management system (CMS) 106, and one or more user access devices 108 ("client computing devices"), which may be coupled to a network 110. User access devices are used by users 150, 152, and 154. Each of the elements 102, 104, 106, 108 and 110 in FIG. 2 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network. In the example embodiment, content providers 102 include advertisers, and CMS 106 is an advertising management system.

The content providers 102 may include any entities that are associated with content (i.e., a content item or multiple content items). In some embodiments, the content includes any form of communication in which one or more products, services, ideas, messages, people, organizations or other items are identified and promoted (or otherwise communicated). Content is not limited to advertisements and commercial promotions. Rather, content may include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device (i.e., a "client computing device"). A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or analyze content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. The relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108.

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website. The CMS 106 may store such information in a general database 146. In some examples, the CMS 106 can add search to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 2. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 2, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 3:
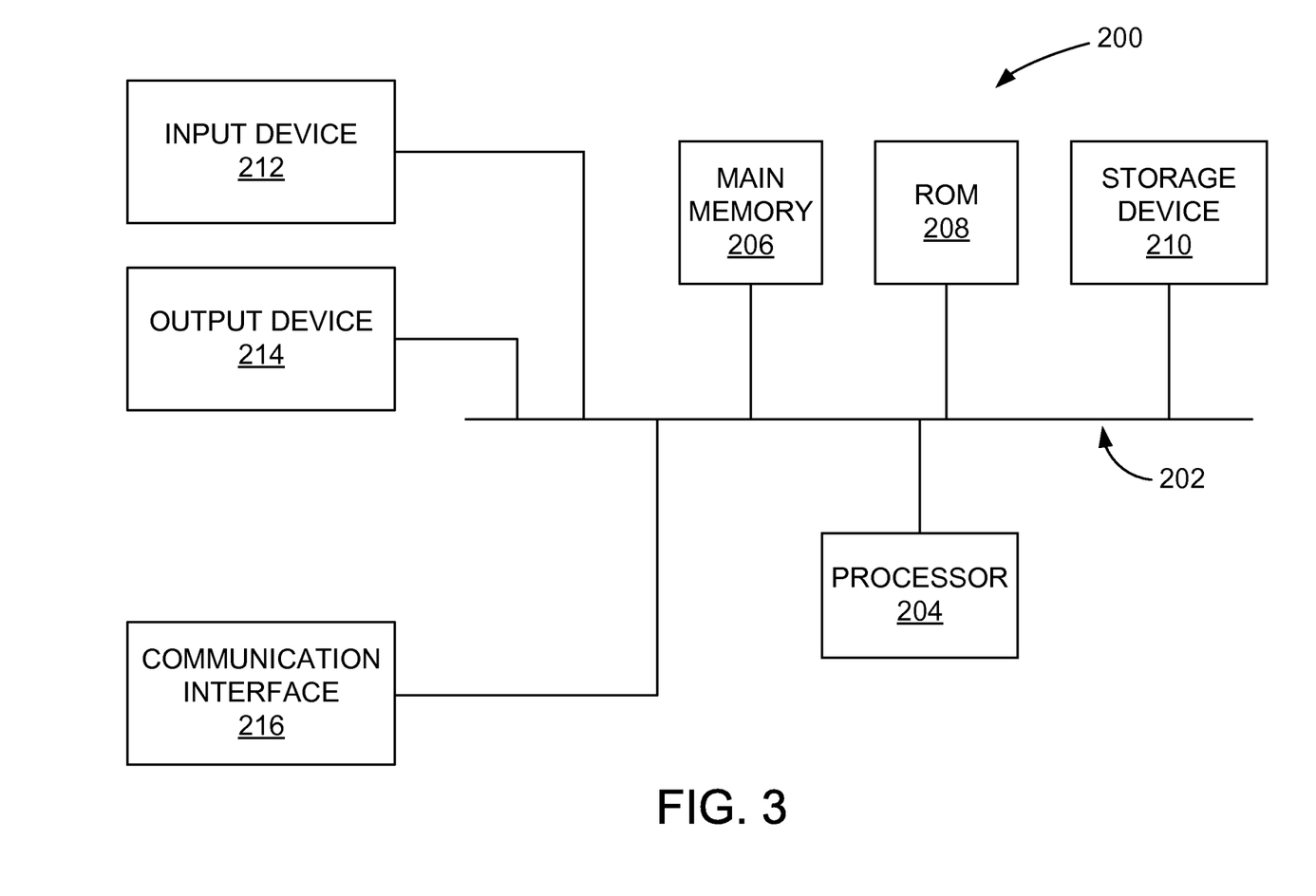
FIG. 3 is a block diagram of an example computing device used for asynchronously serving online content items to a user device as shown in the environment of FIG. 2.

FIG. 3 is a block diagram of an example computing device 200 used for asynchronously serving online content items to a user device as shown in the environment of FIG. 2. More specifically, computing device 200 is configured to transmit online content requests to multiple content providers simultaneously or nearly simultaneously. Computing device 200 is intended to represent various forms of digital computers, such as laptops, desktops, workstations, personal digital assistants, servers, blade servers, mainframes, and other appropriate computers. Computing device 200 is also intended to represent various forms of mobile devices, such as personal digital assistants, cellular telephones, smart phones, phablets, and other similar computing devices. The components shown here, their connections and relationships, and their functions, are meant to be examples only, and are not meant to limit implementations of the subject matter described and/or claimed in this document.

In the example embodiment, computing device 200 could be user access device 108 or any of data processing systems 112, 114, or 116 (shown in FIG. 2). Computing device 200 may include a bus 202, a processor 204, a main memory 206, a read only memory (ROM) 208, a storage device 210, an input device 212, an output device 214 (also known as a display), and a communication interface 216. Bus 202 may include a path that permits communication among the components of computing device 200.

Processor 204 may include any type of conventional processor, microprocessor, or processing logic that interprets and executes instructions. Processor 204 can process instructions for execution within the computing device 200, including instructions stored in the memory 206 or on the storage device 210 to display graphical information for a GUI on an external input/output device, such as display 214 coupled to a high speed interface. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

Main memory 206 may include a random access memory (RAM) or another type of dynamic storage device that stores information and instructions for execution by processor 204. ROM 208 may include a conventional ROM device or another type of static storage device that stores static information and instructions for use by processor 204. Main memory 206 stores information within the computing device 200. In one implementation, main memory 206 is a volatile memory unit or units. In another implementation, main memory 206 is a non-volatile memory unit or units. Main memory 206 may also be another form of computer-readable medium, such as a magnetic or optical disk.

Storage device 210 may include a magnetic and/or optical recording medium and its corresponding drive. The storage device 210 is capable of providing mass storage for the computing device 200. In one implementation, the storage device 210 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 206, ROM 208, the storage device 210, or memory on processor 204.

The high speed controller manages bandwidth-intensive operations for the computing device 200, while the low speed controller manages lower bandwidth-intensive operations. Such allocation of functions is for purposes of example only. In one implementation, the high-speed controller is coupled to main memory 206, display 214 (e.g., through a graphics processor or accelerator), and to high-speed expansion ports, which may accept various expansion cards (not shown). In the implementation, low-speed controller is coupled to storage device 210 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 212 may include a conventional mechanism that permits computing device 200 to receive commands, instructions, or other inputs from a user 150, 152, or 154, including visual, audio, touch, button presses, stylus taps, etc.

Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 2).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 200 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 200 and an entire system may be made up of multiple computing devices 200 communicating with each other.

The processor 204 can execute instructions within the computing device 200, including instructions stored in the main memory 206. The processor may be implemented as chips that include separate and multiple analog and digital processors. The processor may provide, for example, for coordination of the other components of the device 200, such as control of user interfaces, applications run by device 200, and wireless communication by device 200. Instructions may be stored by a cloud service.

Computing device 200 includes a processor 204, main memory 206, ROM 208, an input device 212, an output device such as a display 214, a communication interface 216, among other components including, for example, a receiver and a transceiver. The device 200 may also be provided with a storage device 210, such as a microdrive or other device, to provide additional storage. Each of the components are interconnected using various buses, and several of the components may be mounted on a common motherboard or in other manners as appropriate.

Computing device 200 may communicate wirelessly through communication interface 216, which may include digital signal processing circuitry where necessary. Communication interface 216 may provide for communications under various modes or protocols, such as GSM voice calls, SMS, EMS, or MMS messaging, CDMA, TDMA, PDC, WCDMA, CDMA2000, or GPRS, among others.

Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to device 200, which may be used as appropriate by applications running on device 200.

Figure 4:
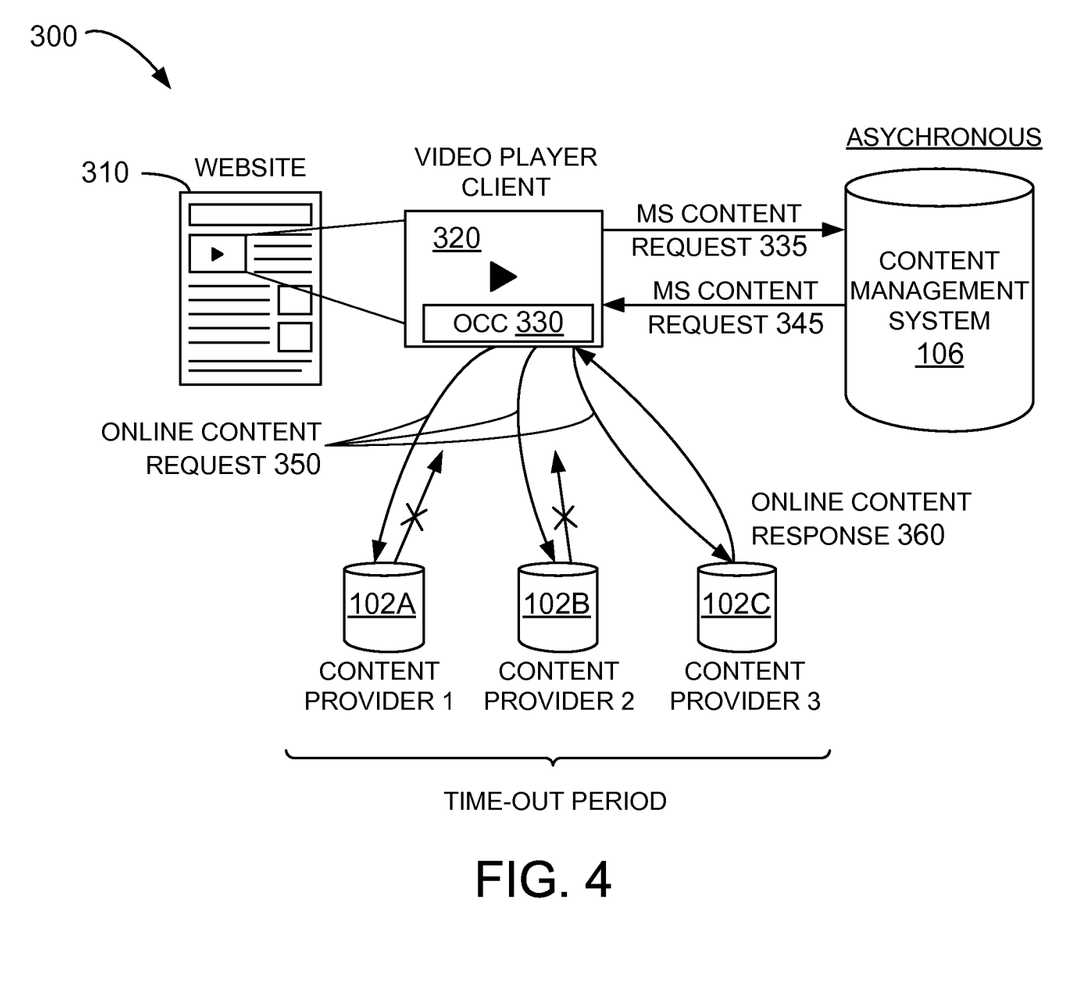
FIG. 4 is a dataflow diagram showing an asynchronous dataflow among a video player, a content management system, and a plurality of online content networks where online content items are provided in an asynchronous method, in accordance with one embodiment of the disclosure.

FIG. 4 is a dataflow diagram showing an asynchronous dataflow 300 among a video player client 320, the content management system 106 shown in FIG. 2, and a plurality of online content networks 102A-C where online content items are provided in an asynchronous method, in accordance with one embodiment of the disclosure. User access device 108 (shown in FIG. 2) includes video player client 320 for displaying online publications. Video player client 320 includes online content controller (OCC) 330 for handling communication with CMS 106 and content providers 102 (shown in FIG. 2). For example, OCC 330 may be an interactive media ad software development kit (also known as an IMA SDK). While displaying online publications from a website 310, OCC 330 is configured to determine that an online content item is to be displayed. OCC 330 transmits a MS content request 335 to CMS 106. In some cases, CMS 106 determines that there are currently no online content items available for serving to OCC 330 (or at least determines there are no appropriate online content items available) and sends a MS content response 345 to video player client 320. In the example embodiment, MS content response 345 contains links to multiple content providers 102A, 102B, and 102C that may be able to provide video player client 320 with online content. MS content response 345 also includes a time-out value (e.g., 4 seconds).

In the example embodiment, OCC 330 generates online content request messages 350 to transmit to all of the content providers 102A-C from MS content response message 345. OCC 330 then transmits all of the generated online content request messages 350 simultaneously or effectively simultaneously (collectively referred to herein as "asynchronously") to the multiple content providers. In the example embodiment, the term "asynchronously" means transmitting the request messages simultaneously (i.e., at the same time) or effectively simultaneously (i.e., nearly at the same time). Transmitting the messages simultaneously means transmitting the messages at the same time and not waiting for the time-out period to expire before sending the next message. Transmitting the messages effectively simultaneously means transmitting the messages at nearly the same time such that all of the messages are sent to the content providers in less than time-out period and in most cases well before the time-out period has expired. Each message is sent at the same time or as close to the same time as possible so as to be transmitted functionally simultaneously.

The asynchronous transmission is defined by one or more transmission rules. In some embodiments, the transmission rules define a delay between transmitting the online content request messages to be zero seconds. In other embodiments, the transmission rules may define the delay between transmitting messages to be greater than zero, but less than the time-out period. In some further embodiments, the transmission rules may order different online content request messages, so that certain requests are transmitted before others.

For example, MS content response message 345 may contain a list of 3 links to 3 different content providers 102A-C and a time-out period of 4 seconds. In this example, OCC 330 generates 3 online content request messages 350, one for each link in MS content response message 345. OCC 330 transmits one of the online content request messages 350 and starts a timer. OCC 330 transmits another online content request message 350 0.1 seconds later. OCC 330 transmits the last online content request message 350 0.1 seconds after that. In this example, all three messages are transmitted within a period of 0.2 seconds, well before the timer reached the time-out period of 4 seconds.

In a further example, one of the 3 online content request messages 350 has priority over the other two online content request messages 350. OCC 330 transmits the online content request message 350 with priority first and starts the timer. OCC 330 delays 1 second before transmitting a different online content request message 350. Then, OCC 330 transmits the last online content request message 350 0.1 seconds later. All three messages are transmitted within a period of 1.1 seconds and well before the time-out period has expired.

After transmitting the online content messages, OCC 330 starts a timer and waits for an online content response message 360 from any of the content providers 102A-C. In the example embodiment, OCC 330 waits until it receives a first online content response message 360 from one of the content providers, which includes a link to an online content item. OCC 330 passes the link for the online content item to the video player client 320, which retrieves the online content item and begins to play the online content item for the user.

If no online content response message 360 is received from any of the content providers 102A-C before the timer expires (e.g., 4 seconds after the first online content request message 350 is transmitted), then video player client 320 begins to play an online publication instead. The online publication may be one that video player client 320 had paused to play the online content or the online publication may be one that video player client 320 had not started playing yet.

In some embodiments, there may be a short delay (less than the time-out period) between the transmission of the online content request messages 350. In these embodiments, one or more of the content providers may have priority over the other content providers. For example, the first content provider 102A may have been given priority over the other two content providers 102B and 102C. After transmitting the online content request message 350 for the first content provider 102A there is a delay period (e.g., 1 second) before transmitting the online content request messages 350 for the other two content providers 102B and 102C.

In additional embodiments, OCC 330 may receive pricing signals from the content providers 102A-C in addition to the online content response messages 360. These pricing signals may be included in the online content response messages 360 or may be provided separately. Instead of playing the online content item received in the first online content response message 360 that OCC 330 received, OCC 330 may wait to receive multiple online content response messages 360. Then OCC 330 compares the pricing signals for the received online content response messages 360 and determines which online content item for video player client 320 to display based on the received pricing signals.

Figure 5:
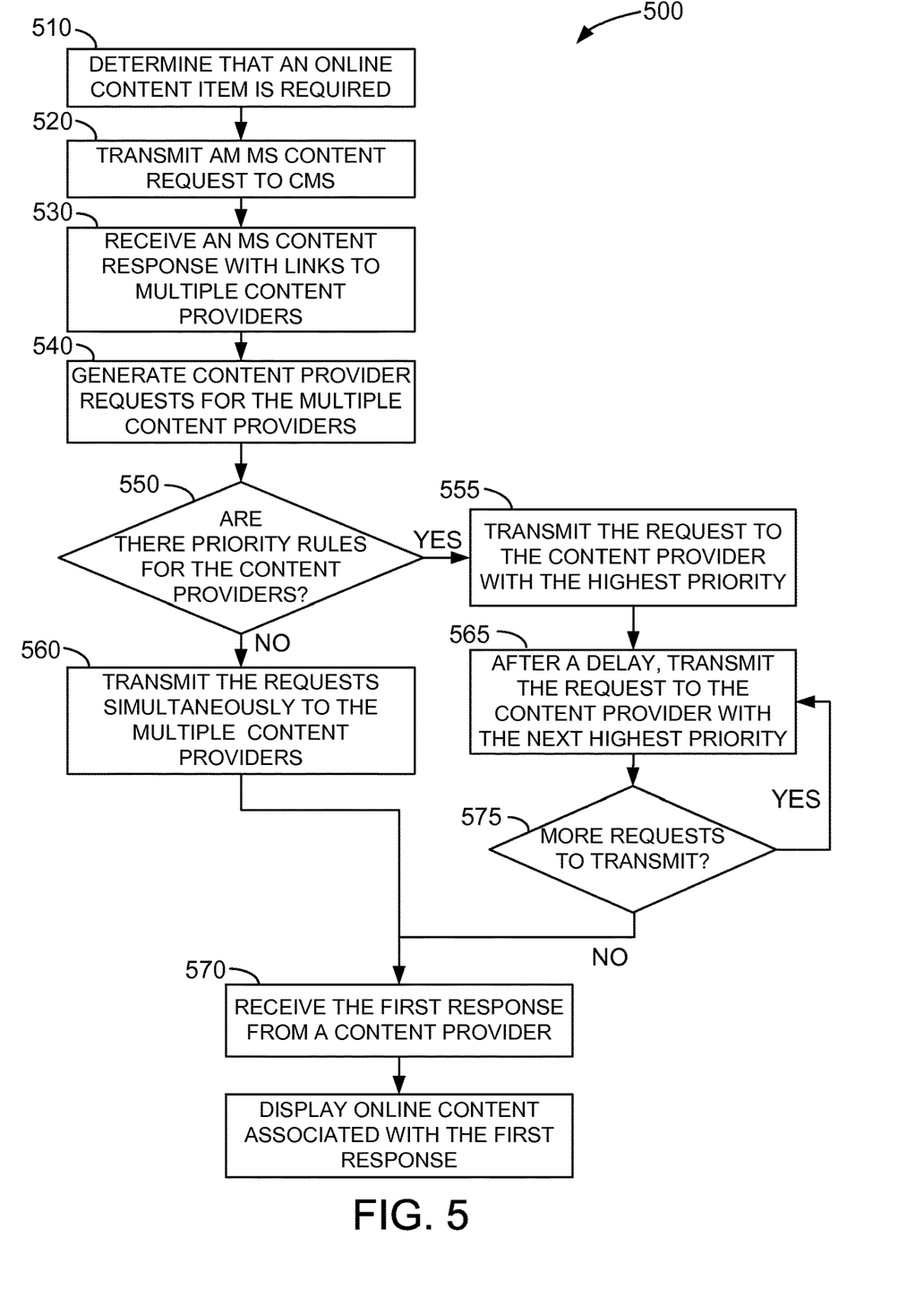
FIG. 5 is a flowchart of an example process for asynchronously requesting a plurality of online content items from online content networks in accordance with one embodiment of the disclosure.

FIG. 5 is a flowchart of an example process 500 for asynchronously requesting a plurality of online content items from content providers 102 (shown in FIG. 2) in accordance with one embodiment of the disclosure. OCC 330 (shown in FIG. 2) determines 510 that an online content item is required. OCC 330 transmits 520 a MS content request 335 (shown in FIG. 4) to CMS 106 (shown in FIG. 2). OCC 330 receives 530 a MS content response 345 (shown in FIG. 4) with links to multiple content providers 102A-C (shown in FIG. 4). OCC 330 generates 540 online content requests 350 (shown in FIG. 4) for the multiple content providers 102A-C. Next, OCC 330 determines 550 if there are any priority rules for the content providers. If there are no priority rules, then OCC 330 transmits 560 the generated online content requests 350 to the multiple content providers 102A-C simultaneously or nearly simultaneously. When OCC 330 receives 570 the first online content response message 360 (shown in FIG. 4) that contains an online content item from one of the content providers 102A-C, OCC 330 instructs the video player client 320 (shown in FIG. 4) to display the online content item.

If there are priority rules for the content providers, then OCC 330 transmits 555 online content request message 350 with the highest priority to the content provider 102A. After a delay, OCC 330 transmits 565 the online content request message 350 with the next highest priority to the content provider 102B. Next, OCC 330 checks 575 if there are more online content request messages 350 to transmit. If there are more online content request message 350 to transmit, then the OCC 330 goes back to step 565. Otherwise, OCC 330 waits to receive an online content response message 360. When OCC 330 receives the first online content response message 360 that contains an online content item from one of the content providers 102A-C, OCC 330 instructs video player client 320 to display the online content item.

Figure 6:
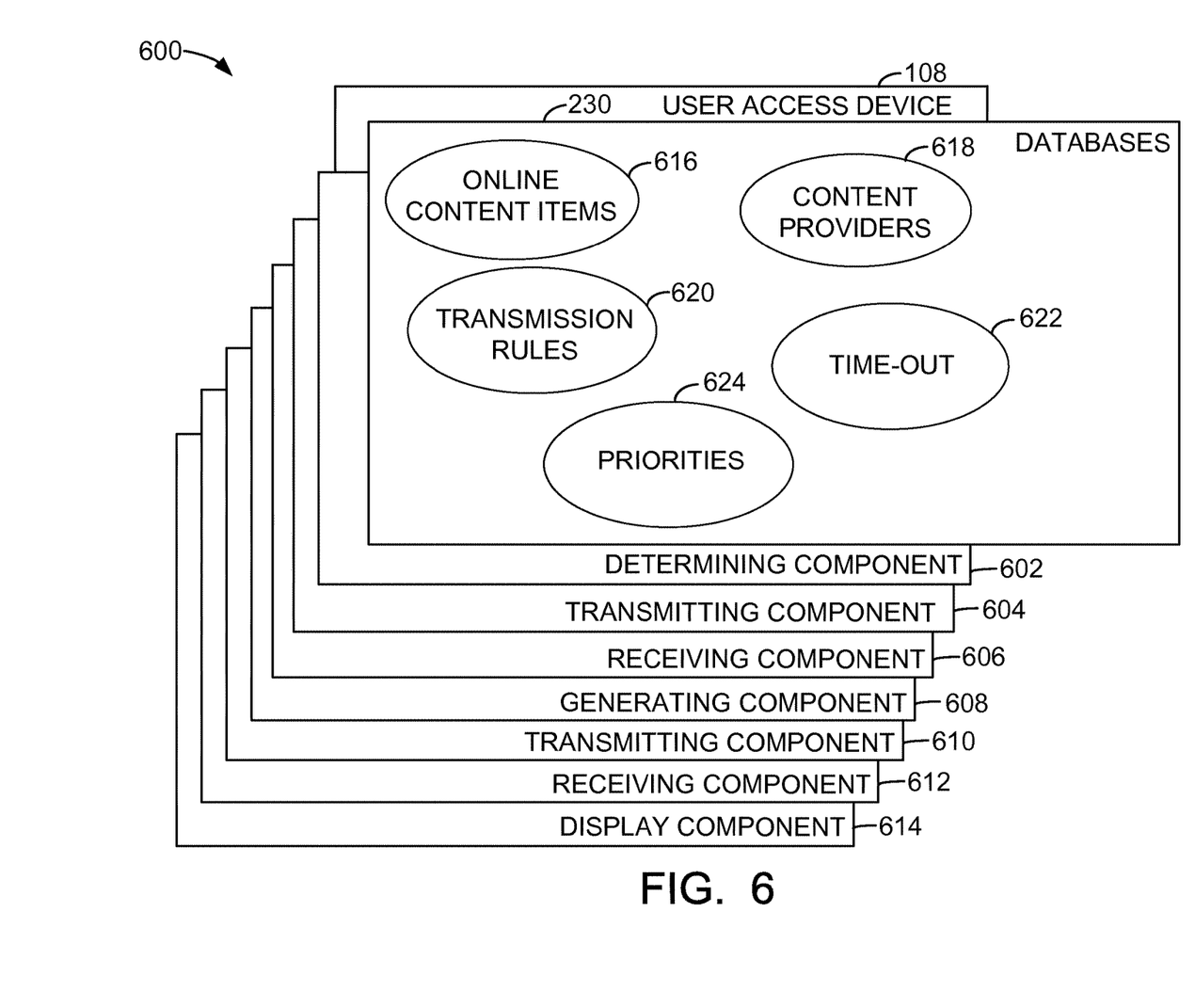
FIG. 6 is a diagram of components of one or more example computing devices that may be used in the environment shown in FIG. 2.

FIG. 6 is a diagram 600 of components of one or more example computing devices 200, which may be used in the environment shown in FIG. 2. For example, one or more of computing devices 200 may be user access devices 108, shown in FIG. 2. FIG. 6 further shows a configuration of a database 630 contained within user access device 108.

User access device 108 includes determining component 602 for determining that an online content item is required, as describe with reference to step 510 (FIG. 5). Additionally, user access device includes a transmitting component 604 for transmitting a MS content request 335 (shown in FIG. 4) to CMS 106 (shown in FIG. 2), as described with reference to step 520 (FIG. 5). User access device 108 also includes a receiving component 606 for receiving a MS content response 345 (shown in FIG. 4) from CMS 106, as described with reference to step 530 (FIG. 5). User access device 108 further includes a generating component 608 for generating a plurality of request messages for online content items to transmit to more than one content provider based on the plurality of links and one or more transmission rules, as described with reference to step 540 (FIG. 5). Moreover, user access device 108 includes a transmitting component 610 for transmitting the online content requests simultaneously to the content providers, as described with reference to step 560 (FIG. 5). In addition, user access device 108 includes a receiving component 612 for receiving the first online content response message 360 from a content provider, as described with reference to step 570 (FIG. 5). And user access device 108 also includes a display component 614 for displaying the online content item contained in the first response as described with reference to step 580 (FIG. 5).

In an example embodiment, the database 630 is divided into a plurality of sections, including but not limited to, an online content items section 616 which may include received online content items, a content providers section 618 which may include links to content providers, a transmission rules section 620 which may include the rules for transmitting multiple online content requests, a time-out section 622, and a priorities section 624 which may include the priorities of the various content providers. These sections within database 630 are interconnected to perform the functions described above.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or variations that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description may present features in terms of algorithms and symbolic representations of operations on information. Such algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-based method for asynchronously requesting content items by a user computing device, said method implemented by the user computing device in communication with a memory, said method comprising:
   receiving, by the user computing device, a content management response including a plurality of links to content providers;
   generating, by the user computing device, a plurality of content request messages for requesting an at least one content item from a plurality of content providers based on the plurality of links included within the content management response and at least one transmission rule, wherein each of the plurality of content request messages have a respective time-out period;
   asynchronously transmitting, by the user computing device, a first content request message to a first content provider of the plurality of content providers and, while the first request is still pending, a second content request message to a second content provider of the plurality of content providers and based on the at least one transmission rule, wherein each content request message is configured to request the at least one content item;
   receiving, by the user computing device, a content response message including a content item from at least one of the first and the second content provider;
   determining, by the user computing device, the content item to display on the user device; and
   displaying the determined content item on the user computing device.

2. The method in accordance with claim 1, wherein the at least one transmission rule defines a period of time between transmitting each content request message to the content providers.

3. The method in accordance with claim 2, wherein the period of time is between 0 seconds and the time-out period included within the content management response.

4. The method in accordance with claim 2, wherein the at least one transmission rule defines a priority of the content providers, wherein a higher priority content provider receives a content request message before a lower priority content provider.

5. The method in accordance with claim 1, wherein the first content request message and the second content request message are asynchronously transmitted to the first and second content providers, wherein asynchronously includes at least one of simultaneously and effectively simultaneously.

6. The method in accordance with claim 1, wherein determining the content item to display further comprises:
   determining the content item received first by the user computing device from the first and second content providers; and
   displaying the first received content item on the user computing device.

7. The method in accordance with claim 1, wherein determining the content item to display further comprises:
   receiving a first price signal from the first content provider;
   receiving a second price signal from the second content provider;
   comparing the first price signal and the second price signal; and
   displaying the determined content item based on the received price signals.

8. The method in accordance with claim 1, further comprising transmitting a content management request to a server to request the at least one content item, the content management request being transmitted before receiving the content management response.

9. The method in accordance with claim 1, wherein the content items are video advertisements.

10. The method in accordance with claim 1, wherein the content management response further includes the time-out period, and wherein the method further comprises:
    simultaneously transmitting the plurality of content request messages to the plurality of content providers;
    starting a timer upon transmitting the plurality of content request messages; and
    playing an online content publication on the user device if no content response message is received before the timer reaches the time-out period.

11. A computing device for asynchronously requesting content items, said computing device includes at least one processor communicatively coupled to at least one memory device, said computing device configured to:
    receive a content management response including a plurality of links to content providers;
    generate a plurality of content request messages for requesting an at least one content item from a plurality of content providers based on the plurality of links included in the content management response and at least one transmission rule, wherein each of the plurality of content request messages have a respective time-out period;
    asynchronously transmit a first content request message to a first content provider of the plurality of content providers and, while the first request is still pending, a second content request message to a second content provider of the plurality of content providers based on the at least one transmission rule, wherein each content request message is configured to request the at least one content item;

receive a content response message including a content item from at least one of the first and second content provider;

determine to display the content item on the computing device; and display the determined content item on the computing device.

12. The computing device in accordance with claim 11, wherein the at least one transmission rule defines a period of time between transmitting each content request message to the content providers.

13. The computing device in accordance with claim 12, wherein the period of time is between 0 seconds and the time-out period included within the content management response.

14. The computing device in accordance with claim 11, wherein the at least one transmission rule defines a priority of the content providers, wherein a higher priority content provider receives a content request message before a lower priority content provider.

15. The computing device in accordance with claim 11, wherein said computing device is further configured to asynchronously transmit the first content request message to the first content provider and the second content request message to the second content provider, wherein asynchronously includes at least one of simultaneously and effectively simultaneously.

16. The computing device in accordance with claim 11, wherein the computing device is further configured to:
    determine the content item to display based on the content item received first by the computing device from the first and second content providers; and
    display the first received content item on the computing device.

17. The computing device in accordance with claim 11, wherein the content items are video advertisements.

18. The computing device in accordance with claim 11, wherein the content management response further includes the time-out period, and wherein the computing device is further configured to:
    simultaneously transmit the plurality of content request messages to the plurality of content providers;
    start a timer upon transmitting the plurality of content request messages; and
    play an online content publication on the user device if no content response message is received before the timer reaches the time-out period.

19. A computer-readable storage device having processor-executable instructions embodied thereon, for asynchronously requesting content items by a user computing device, wherein when executed by the user computing device communicatively coupled to a memory, the processor-executable instructions cause the user computing device to:
    receive a content management response including a plurality of links to content providers;
    generate a plurality of content request messages for requesting an at least one content item from a plurality of content providers based on the plurality of links included within the content management response and at least one transmission rule, wherein each of the plurality of content request messages have a respective time-out period;
    asynchronously transmit a first content request message for to a first content provider of the plurality of content providers and, while the first request is still pending, a second content request message to a second content provider of the plurality of content providers based on the at least one transmission rule, wherein each content request message is configured to request the at least one content item;
    receive a content response message including a content item from at least one of the first and second content provider;
    determine the content item to display on the user computing device; and
    display the determined content item on the user computing device.

20. The computer-readable storage device of claim 19, wherein the at least one transmission rule defines a period of time between transmitting each content request message to the content providers, and wherein the period of time is between 0 seconds and the time-out period included in the content management response.

21. A content management server configured to:
    receive a content management request from a client device requesting the at least one content item;
    process the content management request;
    generate a content management response, including a plurality of links to a plurality of content providers for the at least one content item;
    transmit the content management response to the client device, wherein the client device is configured to generate a plurality of content request messages for requesting the at least one content item from a plurality of content providers based on the plurality of links included within the content management response and at least one transmission rule, wherein each of the plurality of content request messages have a respective time-out period, and asynchronously transmit the plurality of content request messages to the plurality of content providers, wherein asynchronously includes transmitting a second of the plurality of content requests prior to an end to the time-out period of a first content request message transmitted prior to the second of the plurality of content request.

* * * * *